United States Patent [19]

Someya

[11] 4,303,322
[45] Dec. 1, 1981

[54] ELECTRONIC IMAGE PICK-UP DEVICE FOR A SINGLE-LENS REFLEX CAMERA HAVING AN INTERCHANGEABLE FINDER

[75] Inventor: Hiromi Someya, Kawasaki, Japan

[73] Assignee: Canon Kabushiki Kaisha, Tokyo, Japan

[21] Appl. No.: 211,734

[22] Filed: Dec. 1, 1980

[30] Foreign Application Priority Data

Nov. 29, 1979 [JP] Japan .............................. 54-165326[U]

[51] Int. Cl.³ ........................ G03B 7/099; G03B 13/02
[52] U.S. Cl. .................................... 354/31; 354/60 L; 354/219; 358/224
[58] Field of Search .............. 354/23 R, 31, 219, 222, 354/60 L, 60 R; 358/212, 241, 224

[56] References Cited

U.S. PATENT DOCUMENTS 3,724,349  4/1973  Belvaret et al. ..................... 354/31

Primary Examiner—Michael L. Gellner
Attorney, Agent, or Firm—Toren, McGeady & Stanger

[57] ABSTRACT

A removably attachable electronic image pick-up device for use with a single lens reflex camera, includes a casing which is shaped to fit in a receptacle on the camera body, which receptacle is otherwise used to seat a replaceable optical finder to display an object image. The device also includes a solid state image sensor arranged within the casing to produce photosignals which are processed by a control circuit to a prescribed form of picture signal, and the picture signal is then supplied to an outlet connector. Accordingly, when a display device or a video tape recorder is connected to the outlet connector, the object image can be displayed on the display device, or the image can be recorded on the video tape recorder.

9 Claims, 5 Drawing Figures

ELECTRONIC IMAGE PICK-UP DEVICE FOR A SINGLE-LENS REFLEX CAMERA HAVING AN INTERCHANGEABLE FINDER

BACKGROUND OF THE INVENTION

1. Field of the Invention

This invention relates to an electronic image pick-up device, and more particularly to an electronic image pick-up device in the form of an attachment for use with a single lens reflex camera of the type which can accept or seat a replaceable optical finder, at a receptacle on the camera body which is shaped to fit the finder housing.

2. Description of the Prior Art

Recently, there has been widespread use of compact video cameras which are connected to relatively small, home video tape recorders so as to provide portable magnetic picture recording systems. At present, however, video tape recorders and video cameras are relatively high priced, and many potential users cannot afford to buy them.

For example, in order to broaden the capabilities of the video cameras to record desired pictures more efficiently, considering various aspects of the objects being photographed, a great number of interchangeable lenses, each of a different focal length, or at least a few zoom lenses are required. This amounts to a high level of cost. Another problem is that a person who thus far has not been familiar with video cameras, must undergo some training before he or she can master the use of the video camera. Therefore, an amateur cannot handle the video camera from the beginning in the same manner as when one first takes snapshot photographs using an ordinary photographic camera.

For these reasons, even though there are more than a few users of home video tape recorders which, when connected to television sets, operate to record and reproduce television signals, relatively few also possess a video camera. Of the video camera users, only a few can handle their own cameras easily. Accordingly, there is a demand for a video camera of comparatively low cost and which is simple to manage.

Moreover, single lens reflex cameras have also gained widespread acceptance. This type of camera, however, has a drawback in that as its reflex mirror flips upward to allow an exposure, the object image which is provided just when the shutter is released cannot be observed by looking through the camera finder. Another drawback is that when the image in the finder is to be viewed with a change of the image magnification, the finder unit must be interchanged with a special unit. Still another drawback is that with the conventional single lens reflex camera finder, it is impossible to remotely control the operation of the camera while permitting the operator to observe the object image in the field of view of the finder.

SUMMARY OF THE INVENTION

An object of the present invention is to provide an electronic image pick-up device which can overcome all the above drawbacks of the conventional video cameras and single lens reflex cameras.

Another object of the invention is to provide an electronic image pick-up device which, when attached to a single lens reflex camera at a receptacle on the camera body which seats a replaceable finder unit, allows the single lens reflex camera to be used as a video camera.

Still another object of the invention is to provide an electronic image pick-up device which can be used as an electronic finder for a single lens reflex camera, when the device is set in a receptacle on the camera body which seats a replaceable finder unit.

In accordance with the invention, the electronic image pick-up device includes a casing shaped to fit in a receptacle on the body of a single lens reflex camera which receptacle otherwise seats a replaceable finder unit. A solid state image sensor is arranged at a certain position within the casing so that an optical object image provided in the camera is applied to an image-receiving surface of the solid state image sensor when the casing is seated on the camera. The solid state image sensor produces photosignals which are processed by a control circuit into a picture signal of prescribed form.

By providing a display device responsive to the picture signal for electronically displaying the object image, the present device can be used as part of an electronic finder for the single lens reflex camera. If the picture signal is provided to a video tape recorder, the single lens reflex camera then can function as a video camera.

When the electronic image pick-up device is used with the display device as an electronic finder for the single lens reflex camera, it is then possible to maintain the visibility of the state of the object image at the moment an exposure takes place, and the magnification of the object image can be adjusted to a desired value. It is also possible to provide an arrangement such that even when the camera operation is remotely controlled, the object image can be observed. By using the single lens reflex camera as part of a portable magnetic picture recording system, it is possible to realize an inexpensive video camera which is simple to handle.

The various features of novelty which characterize the invention are pointed out with particularity in the claims annexed to and forming a part of this disclosure. For a better understanding of the invention, its operating advantages and specific objects attained by its use, reference should be had to the accompanying drawing and descriptive matter in which there are illustrated and described preferred embodiments of the invention.

DETAILED DESCRIPTION OF THE INVENTION

Figure 1:
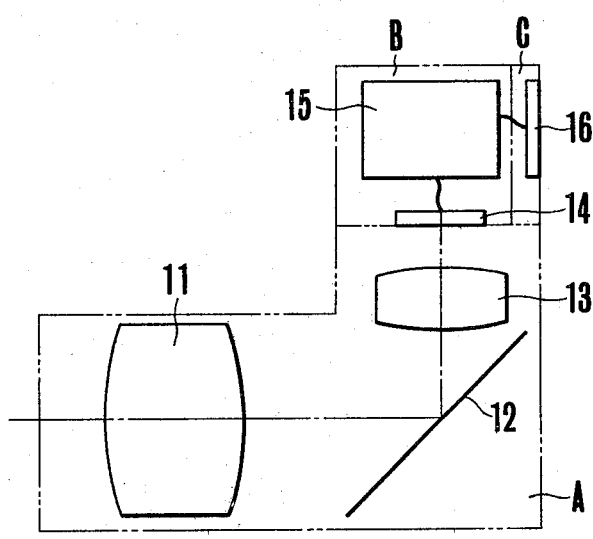
FIG. 1 is a schematic view of an optical arrangement in a single lens reflex camera including an embodiment of the electronic image pick-up device of the present invention.

FIG. 1 shows, schematically, an optical arrangement of a single lens reflex camera, which arrangement is enclosed by block A. The camera is designed so that its associated optical finder unit (not shown) is replaceable. Such optical finder unit may include a removably attachable pentaprism housing. However, instead of an optical finder unit, an electronic image pick-up device B according to the present invention is attached at the portion of the camera which accepts the finder unit.

Block A also includes an objective lens 11 of the camera. As is known in the art of single lens reflex cameras, the lens 11 is arranged to be removably mounted on the camera body. Light from an object being photographed passes through the objective lens 11 to a movable reflex mirror 12. The mirror 12 is arranged to be moved upward to a non-viewing position upon actuation of a release button (not shown), and to be held at this position until an exposure is terminated. Upon termination of the exposure, mirror 12 returns to a viewing position where it forms an inclined angle with the optical axis through lens 11 as shown in FIG. 1. The object image light from the objective lens 11 is then reflected upward by the mirror 12 and focused by a condenser lens 13 onto a focusing screen (not shown) as in the conventional single lens reflex cameras.

The image pick-up device B is constructed to have the outer form of an optical finder unit which can be seated to the body of the camera at a receptacle on the camera body which receptacle seats the optical finder unit, and in place of the optical finder unit. The device B is provided with a solid state image sensor 14, such as a MOS type image sensor or CCD (charge coupled device), positioned to face the focusing screen in the camera body. The solid state image sensor 14 is coupled to and read out by a control circuit 15. Specifically, control circuit 15 applies readout address information sequentially to the solid state image sensor 14. Photo-signals from the solid state image sensor 14 are then provided as time sequential signals which are processed by the control circuit 15 in a certain manner to produce a picture signal of prescribed waveform. The picture signal is then applied to a solid state display device C. The solid state display device C is constructed with, for example, liquid crystal display elements 16 responsive to the picture signal from the control circuit 15 for presenting a display of the reproduced image in a plane formed by the elements 16. Although the display device C is shown in FIG. 1 as being constructed together with the image pick-up device B, the display device C also may be constructed in separate form from the image pick-up device B. In the latter case, the image pick-up device B and the solid state display device C are connected to one another by a cable.

Figure 2:
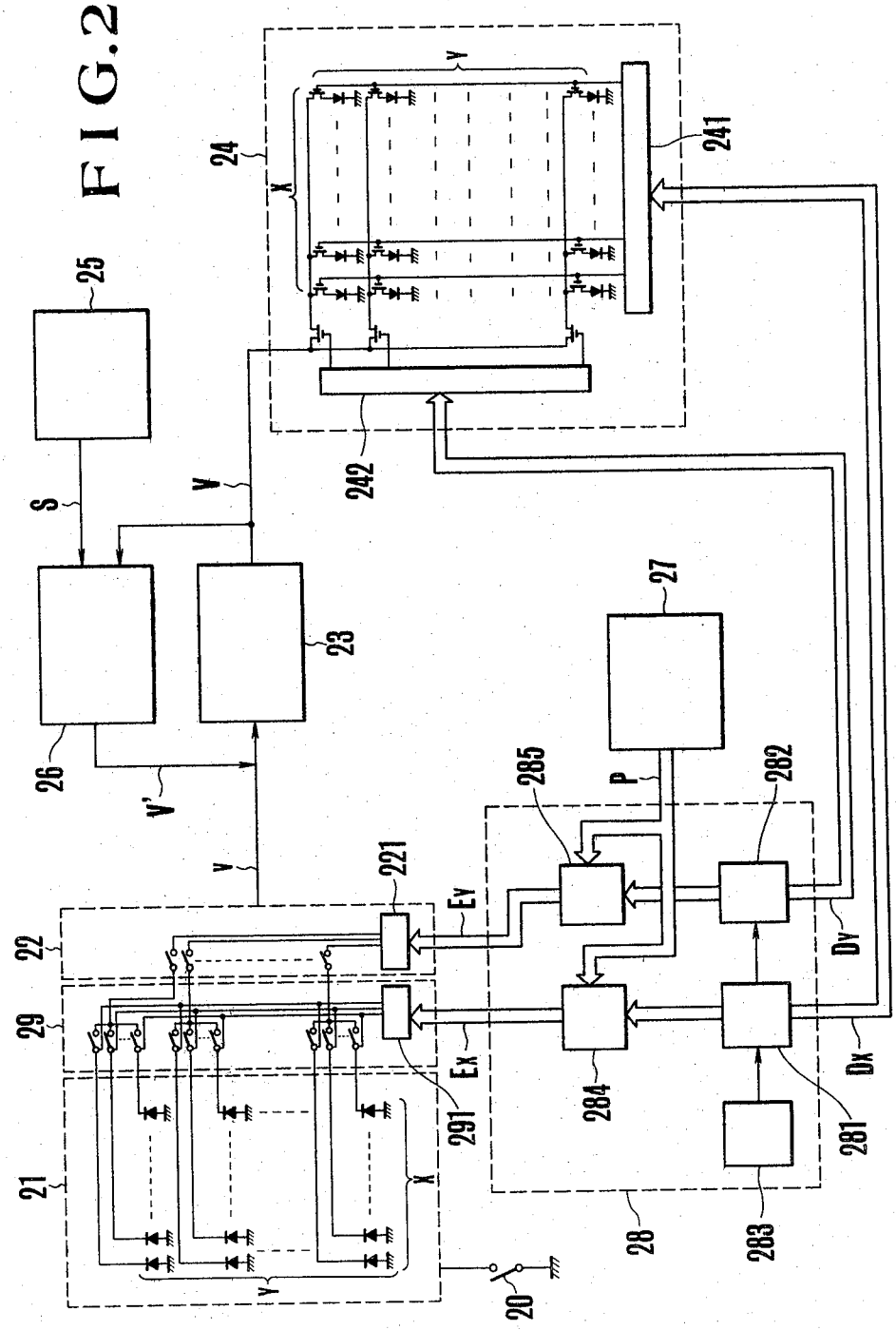
FIG. 2 is an electrical block diagram showing the circuitry of the electronic image pick-up device of FIG. 1.

FIG. 2 is a schematic diagram showing details of the electrical circuitry of the image pick-up device B shown in FIG. 1, including the control circuit 15. In FIG. 2, a solid state image pick-up element 21 corresponds to the image sensor 14 of FIG. 1. The solid state image pick-up element 21 can be, for example, a MOS type image sensor having its individual image sections arranged in a matrix including lines (X) and rows (Y). A selection circuit 29 coupled to the image pick-up element 21 operates to sequentially address the image sections of the solid state image pick-up element 21 in lines (X) to read out photo-signals from the individual image sections, so that a parallel picture output signal is produced for each row (Y).

A multiplexer 22 coupled to the selection circuit 29 is responsive to the parallel picture output signal supplied from the selection circuit 29 for each row (Y), and produces a series time-sequential picture output signal v. The solid state image pick-up element 21, selection circuit 29 and multiplexer 22 together constitute a conventional solid state image pick-up element circuit. Although not shown in greater detail in FIG. 2, the solid state image pick-up element circuit is provided with a known memory function (hold function) so that when, for example, a hold switch 20 which is connected to a power supply circuit (not shown) is closed, the picture signal produced by the solid state image pick-up element 21 is held by the element 21 itself. When the switch 20 is opened, the element 21 returns to an initial state wherein a picture signal is developed again. The hold switch 20 is located within the camera body according to the present embodiment, as will be more fully described below.

The picture output signal v from the multiplexer 22 is applied to a picture amplifying circuit 23 where it is amplified to a predetermined level to provide a picture signal V which is then applied to a display device 24. The circuitry of the display device 24 corresponds to that of the display device C shown in FIG. 1.

The picture signal V provided by the picture amplifying circuit 23 is also applied to a gain control circuit 26. The gain control circuit 26 is responsive to a light value information signal S provided by an external brightness measuring element 25 such as Cds. The circuit 26 controls the gain of the picture amplifying circuit 23, so that the picture signal level is automatically adjusted to a proper value. The picture signal V thus is converted to a picture signal V′ of a magnitude corresponding to the light value information signal S, and the signal V′ is fed back to the picture amplifying circuit 23.

An address information circuit 28 produces address information EX,EY to read out the solid state image pick-up element 21, and provides display address information DX,DY to the display device 24 synchronized with the image address information EX,EY. The address information circuit 28 produces the address information EX,EY corresponding to a selected field of view, in response to a field of view setting signal P from a field of view changeover circuit 27. That is, the address information circuit 28 is provided with a line counter 281 for forming line (X)-directional address information, and a row counter 282 for forming row (Y)-directional address information. Each of the counters 281,282 is arranged to count a number ranging from, for example, $-N$ to $+(N-1)$ in complement of "2" (where N is a positive integer).

The line counter 281 advances each time it receives a clock signal K from a clock generator 283, and the counting cycle of $-N, -N+1, -N+2, \ldots -1, 0, +1, \ldots, +(N-1)$ is repeatedly carried out, in sequence. The row counter 282 advances one count each time one cycle of the counting operation by the line counter 281 has been completed, and the counting operation cycle of the row counter 282 is repeated according to a rule similar to that for the line counter 281. The address information from each of the counters 281,282 is applied to associated multipliers 284,285. Also, line address information DX from line counter 281 is provided to line decoder 241 of display device 24, and row address information DY from row counter 282 is provided to row decoder 242 of the display device.

The output information from each of the multipliers 284,285 is applied as line address information EX to a decoder 291 of the selection circuit 29, and as row address information EY to a decoder 221 of the multiplexer 22. Accordingly, the solid state image pick-up element 21 and the display device 24 must be driven synchronously with one another so that each individual picture element of the solid state image pick-up element 21 is displayed by the correct, corresponding element of the display device.

Multipliers 284, 285 each produce an output which corresponds to a multiplication of the value of supplied data in response to the field of view setting signal P from the changeover circuit 27, that is, the value "$d_X$" of line address information DX, and the value "$d_Y$" of row address information DY, multiplied by $1/\alpha$ (where $\alpha$ is a positive integer). As a result, the values of address information EX and EY, or "$e_X$" and "$e_Y$" for the image pick-up element 21, are made equal to $d_X/\alpha$ and $d_Y/\alpha$, respectively. Therefore, the image elements X and Y on the display device 24 correspond to the image elements $X/\alpha$ and $Y/\alpha$ on the solid state image pick-up element 21. The number of image elements read out are reduced $\alpha$-times, but an $\alpha$-times enlarged image is displayed. Multipliers 284,285 may be, for example, shift registers which shift to the right by a variable number of bits in response to the field of view setting signal P. It is then very easy to perform the multiplication by $1/\alpha$ (in this instance, $\alpha$ is the factorial of 2).

The field of view changeover circuit 27 is provided with a field of view setting slide switch having a movable contact terminal (not shown in FIG. 2). The position of the movable terminal of the slide switch is set so that a certain field of view setting signal P is produced. In the present embodiment, the slide switch is provided in the display device C for reasons set out later below. The possibility of enlarging the field of view by such an arrangement arises when the solid state image pick-up element 21 is of a type which allows selection of line address and row address to be performed at random, for example, a MOS image sensor.

With the MOS type of image sensor, each line and each row can be selected by MOS switches in response to line and row address information EX,EY from the address information circuit 28, this address information being in the form of data of complement of two corresponding to $-N \sim +(N+1)$. By controlling the MOS switches, depending on the outputs from the decoders 291,221, the picture signal from the solid state image pick-up element 21 is selected. However, even when the solid state image pick-up element 21 is of CCD or the like, which is not capable of randomly selecting line and row addresses, it is possible to provide an arrangement such that the field of view can be varied in a manner similar to that described above. In such case, in order to bypass unnecessary image elements, means are provided for changing the clock speed (frequency) of the line counter and the row counter. The display device 24 may be, for example, a liquid crystal display device as disclosed in Japanese patent Sho 52-36656. The remaining circuits in FIG. 2 are conventional, so that detailed descriptions of their configurations are not required.

Figure 5:
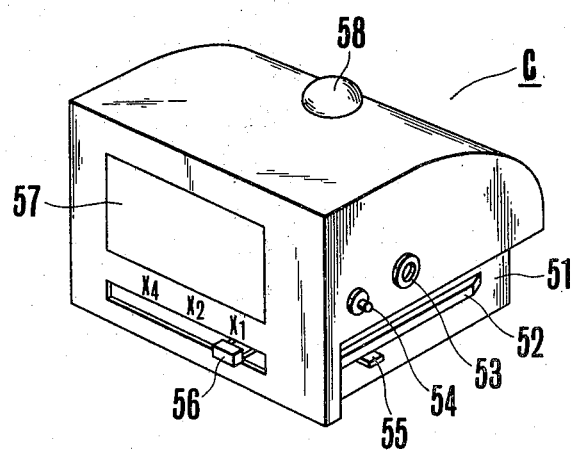
FIG. 5 is a perspective view of a display device which can be used in combination with the electronic image pick-up device of FIG. 3.
Figure 3:
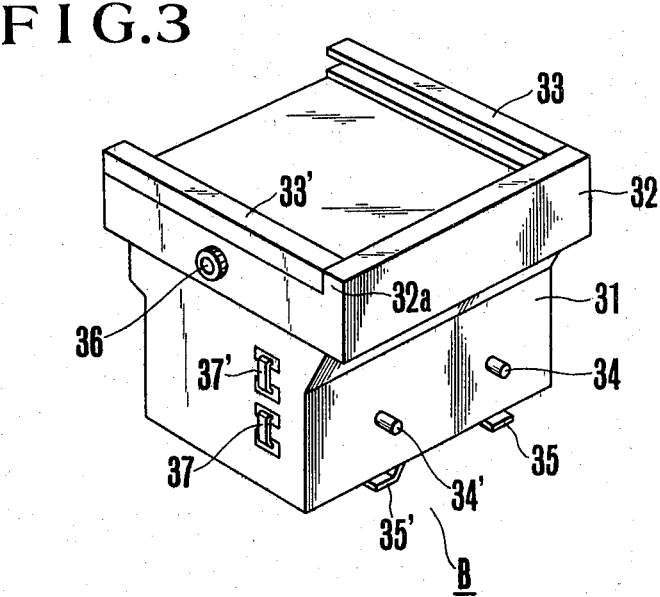
FIG. 3 is a perspective view showing the casing of the electronic image pick-up device of FIG. 1.
Figure 4:
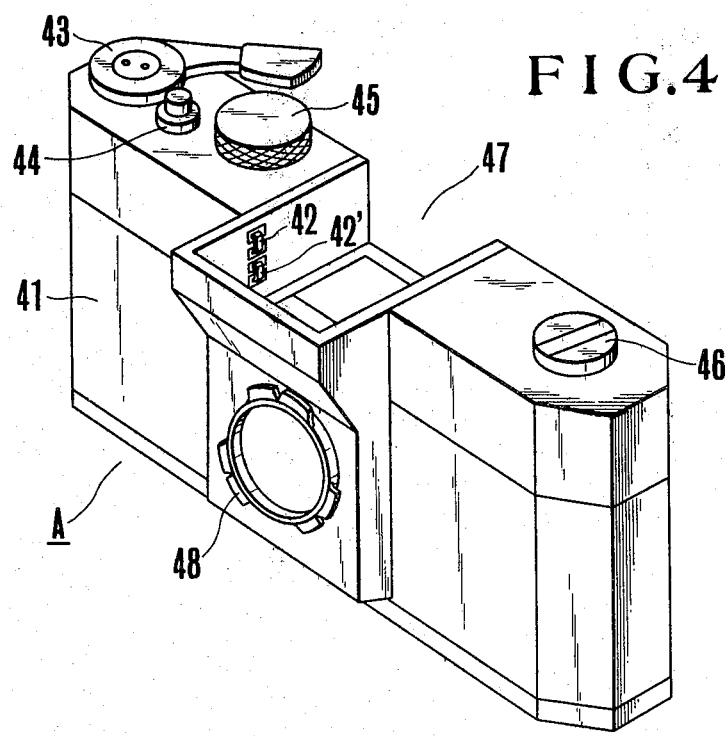
FIG. 4 is a perspective view of a single lens reflex camera showing a portion of the camera to which the image pick-up device of FIG. 3 can be attached in place of an optical finder unit.

FIGS. 3-5 show details of the device in FIG. 1, with FIG. 3 displaying the image pick-up device B, and FIG. 4 exhibiting the single lens reflex camera body. FIG. 5 shows the display device C which can be integrally attached to the image pick-up device B of FIG. 3.

In FIG. 3, the image pick-up device B includes a casing 31 having upper and lower surfaces, and the solid state image pick-up element 14 which is arranged at a certain position (not shown) on the lower surface of the casing 31. The control circuit 15 for the image pick-up element 14 is arranged in the interior of the casing 31. Casing 31 also has a front surface, and a pair of engagement pins 34,34' projecting from the front surface. A pair of tension springs 35,35' are provided at the front edge of the lower surface. The configuration of casing 31 is complementary to the shape of a finder acceptor or receptacle 47 on the camera body, described below, so that the casing 31 is attachable to the finder receptacle 47 (FIG. 4).

The pair of engagement pins 34,34' are arranged to engage a pair of holes (not shown) formed in the receptacle 47 of the camera body A, and operate to retain the image pick-up device B accurately and reliably within the camera body. The pair of tension springs 35,35' operate to mount the image pick-up device B resiliently to the camera body. The casing 31 also has a side surface on which there are provided contact terminals 37,37'. Another receptacle 32 is provided at the upper surface of the casing 31, so that the display device C can be attached to and united with the receptacle 32. A projecting wall 32a at the front of the receptacle 32 forms part of a "U" shaped receptacle frame, together with a pair of grooved, parallel retainer walls 33,33' which are fixed to the receptacle 32. A picture signal output terminal 36 is provided on one side of the wall 33' of the receptacle 32.

FIG. 4 shows a camera body 41 having a finder unit receptacle 47 in the form of a recess at the upper central portion of the body 41 whereat the finder unit including a pentaprism (not shown) can be attached. The concave finder unit receptacle 47 is generally "U" shaped, and is formed in part by a front panel wall and a pair of parallel, spaced apart side panel walls. A pair of engagement holes (not shown) are formed in the front panel wall for receiving the engagement pins 34,34' of the image pick-up device B, and a pair of contacts 42,42' are provided on one side of the panel wall in such positions that when the image pick-up device B is attached to the receptacle 47, the contacts 42,42' are electrically connected to the contact terminals 37,37' of the device B. The hold switch 20, described above, is connected between the contacts 42,42' in the interior of the camera body 41. Hold switch 20 is arranged to be opened and closed in response to movement of the camera reflex mirror 12 (FIG. 1). When the reflex mirror 12 is in an upwardly lifted position, hold switch 20 is closed. The camera body 41 further includes a conventional film winding lever 43, a release button 44, a film speed setting dial 45, a film rewinding crank 46 and an objective lens coupling 48 arranged as shown in FIG. 4.

As shown in FIG. 5, display device C has a fitting portion 51 having a pair of parallel, spaced-apart side surfaces for insertion in the "U" shaped acceptor frame of the image pick-up device B. Horizontal projections 52 are formed on both of the side surfaces of the fitting portion 51 for sliding engagement in the grooves of the retainer walls 33,33' forming part of the receptacle frame. A locking member 55 is provided on one side surface of the fitting portion 51. The locking member 55 is urged by a spring (not shown) to project resiliently so that when the display device C is attached to the receptacle frame, the locking member 55 is brought into engagement with an engagement portion (not shown) formed at a corresponding position on the receptacle frame so that the display device C is locked in an operating position. The lock member 55 is arranged so that when a lock release button 54 on the same side of the surface of the display device C is depressed, the member 55 is retracted toward the interior of the device C, thereby disengaging the member 55 from the engagement portion on the receptacle frame. A picture signal input terminal 53 is provided in the vicinity of the lock release button 54.

A solid state display plate 57 (corresponding to the display element 16), e.g., a liquid crystal display plate, is arranged in the back surface of the display device C to present a display of a reproduced image according to the picture signal supplied to the input terminal 53. A field of view setting slide switch 56 is arranged below the display plate 57. As mentioned above, slide switch 56 operates to set a desired field of view setting signal S which is to be provided from the field of view changeover circuit 27. When set in the "X1" position, the entire field of view is displayed over the area of the display plate 57, and when in an "X2" position, only the central area of the field of view with two times magnification is displayed on the plate 57 in accordance with the operation of the changeover circuit 27. When in an "X4" position, changeover circuit 27 operates to provide a display of the central area of the field of view with four times magnification. A light receiving window 58 is provided on the upper surface of the display device C. Light receiving window 58 directs light to the light sensitive element 25 (FIG. 2) to allow the ambient light to be measured within the interior of the display device C.

The image pick-up device B of the above construction can then be used by attachment of the device B to the finder unit receptacle 47 of the camera body 41. When the image pick-up device B is to be attached to the receptacle 47, the image pick-up device B is inserted from the open side of the "U" shaped concave portion forming the receptacle 47. At this time, the pair of engagement pins 34,34' provided on the casing 31 are fitted in the holes in the front panel wall forming part of the receptacle 47, wherein the attached, operating position of the image pick-up device B is precisely set. Also, the pair of tension springs 35,35' provided on the casing 31 stabilize the attached condition of the image pick-up device B in the receptacle 47.

When attached to the finder receptacle 47 of the camera body 41, the image pick-up device B has its pair of contact terminals 37,37' on the casing 31 electrically connected with the contacts 42,42' provided on one of the side panel walls forming the receptacle 47. Also, the image receiving surface of the solid state image pick-up element 14 is illuminated by an object optical image which is provided by the objective lens 11, reflex mirror 12 and condenser lens 13, as shown in FIG. 1. The optical image on the image receiving surface is converted to a picture signal of a prescribed form by the solid state image pick-up element 14 and control circuit 15, and this picture signal is supplied to the picture output terminal 36. With the display device C of FIG. 5 attached to the image pick-up device B at the pick-up device receptacle 32, and with the picture signal output terminal 36 connected to the picture signal input terminal 53 of the display device C by a cable, the object image is displayed on the display surface of the solid state display plate 57. That is, the image pick-up device B and the display device C together act as an electronic finder. In this case, the field of the finder image displayed on the solid state display plate can be set to two times enlargement, or four times enlargement by operation of the field of view selection slide switch 56. Further, the picture signal output terminal 36 can be electrically connected to a picture signal input terminal of a video tape recorder (not shown) by a cable, and the image displayed on the solid state display plate 57 can be recorded. To obtain a picture signal of the desired object, the camera body 41 only need be aimed at an object desired to be photographed, and the objective lens 11 adjusted to focus the image obtained. The photographic camera therefore can be used as a video camera. Image recording with a video tape recorder then can be performed with the same degree of handling required to manage the photographic camera, and a camera system including a given set of interchangeable lenses can still be used without modification. Since the gain of the picture amplifying circuit 23 is automatically controlled according to the output of the light sensitive element 25, so that the picture signal level depends upon the brightness of the object environment during an exposure, a signal which is appropriate for the environmental brightness is continually provided during the display and recording of the object image.

When the operator desires to expose photographic film in the camera body 41 during a recording operation on a magnetic tape, the operator need only to depress the release button 44 on the camera 41. When the release button 44 is depressed, an exposure operation similar to that occurring in an ordinary camera takes place. In this case, the movable reflex mirror 12 is flipped upward, and the hold switch 20 is closed. During the time the reflex mirror 12 is in the flipped up position, the image pick-up element 21 produces a picture signal of the object image which is the same as the picture signal provided just before the beginning of the exposure. This picture signal is displayed and recorded. That is, even when the camera is performing an exposure operation, display and recording of the image is carried out without interruption since the object image provided just before exposure is continuously displayed and recorded.

In the present embodiment, only the picture signal has been explained in detail, and details concerning the address information DX and DY to be supplied to the display device C from the image pick-up device B, and the light value information from the light sensitive element 25 to be supplied from the display device C to the image pick-up device B, and particulars regarding the output of the slide switch 56 have been omitted since such details are known in the art. However, it is, of course, necessary to electrically connect the image pick-up device B with the display device C by electrical connecting means such as a cable in order that the address and light value information signals, and the output signal of the slide swich 56 are properly directed between both devices B,C. This can be achieved by arranging corresponding terminals, for example, near the picture signal output terminal 36 and picture signal input terminal 53, so that when the picture signal output terminal 36 is electrically connected to the picture signal input terminal 53, these additional connections are established simultaneously. Incidentally, the light sensitive element 25 and the slide switch 56 may be provided in the image pick-up device B, rather than in the display device C.

While specific embodiments of the invention have been shown and described in detail to illustrate the application of the inventive principles, it will be understood that the invention may be embodied otherwise without departing from such principles.

What is claimed is:

1. An electronic image pick-up device for attachment to a single lens reflex camera of the type which can accept a replaceable optical finder at a finder unit receptacle on the camera body, comprising:
   (a) a casing shaped to fit the finder unit receptacle on the camera body;
   (b) a solid state image pick-up element having an image receiving surface arranged within said casing so that an object image provided in the camera is applied on said image receiving surface when said casing is attached to the camera, and said solid state image pick-up element operates to produce picture signal elements in response to said object image;
   (c) a readout control circuit coupled to said solid state image pick-up element for reading out a picture signal of prescribed form including said picture signal elements from said solid state image pick-up element; and
   (d) a picture signal output terminal on said casing, said picture signal output terminal being coupled to said readout control circuit to provide said picture signal.

2. An electronic image pick-up device according to claim 1, including a display device having a display surface, and casing has a display device receptacle for receiving said display device, and means for electrically connecting said display device to said picture signal output terminal so that said picture signal is reproduced on said display surface.

3. An electronic image pick-up device according to claim 1, wherein said readout control circuit includes a picture signal amplifying circuit for increasing the level of said picture signal in accordance with a controllable circuit gain, and means for controlling the gain of said picture signal amplifying circuit in accordance with the level of ambient illumination outside said casing.

4. An electronic image pick-up device according to claim 1, wherein said readout control circuit includes an address circuit for providing an address signal to select a picture element at a particular location on said image receiving surface of said solid state image pick-up element, and a field of view changeover circuit for controlling said address circuit so that said picture signal from said readout control circuit represents an enlargement of the object image applied to a particular portion of said image receiving surface.

5. An electronic image pick-up device according to claim 1, wherein said solid state image pick-up element is operative to memorize said picture signal so that the state of said picture signal at a time immediately prior to commencement of an exposure by the camera is memorized by said solid state image pick-up element during the camera exposure.

6. An electronic range pick-up device for attachment to a single lens reflex camera of the type which can accept a replaceable optical finder at a finder unit receptacle on the camera body, comprising:
   (a) a casing shaped to fit the finder unit receptacle on the camera body;
   (b) a solid state image pick-up element having an image receiving surface arranged within said casing so that an object image provided in the camera is applied on said image receiving surface when said casing is attached to the camera, and said solid state image pick-up element operates to produce picture signal elements in response to said object image;
   (c) a readout control circuit coupled to said solid state image pick-up element for reading out a picture signal of prescribed form including said picture signal elements from said solid state image pick-up element; and
   (d) a display device for reproducing said picture signal from said readout control circuit, said display device including a display surface for reproducing the picture signal on said display surface.

7. An electronic image pick-up device according to claim 6, wherein said readout control circuit includes a picture signal amplifying circuit for increasing the level of said picture signal in accordance with a controllable circuit gain, and means for controlling the gain of said picture amplifying circuit in accordance with the level of ambient illumination outside said casing.

8. An electronic image pick-up device according to claim 6, wherein said readout control circuit includes an address circuit for providing an address signal to select a picture element at a particular location on said image receiving circuit of said solid state image pick-up element, and a field of view selection circuit for controlling said address circuit so that said picture signal from said readout control circuit represents an enlargement of the object image applied to a particular portion of said image receiving surface.

9. An electronic image pick-up device according to claim 6, wherein said solid state image pick-up element is operative to memorize said picture signal so that the state of said picture signal at a time immediately prior to commencement of an exposure by the camera is memorized by said solid state image pick-up element during the camera exposure.

* * * * *